US005153982A

United States Patent [19]

Bertocchi

[11] Patent Number: 5,153,982

[45] Date of Patent: Oct. 13, 1992

[54] APPARATUS FOR ARRANGING AND INSERTING TERMINALS IN AN ELECTRICAL COMPONENT

[75] Inventor: Daniele Bertocchi, Cento, Italy

[73] Assignee: AXIS, S.p.A., Florence, Italy

[21] Appl. No.: 651,603

[22] Filed: Feb. 6, 1991

[30] Foreign Application Priority Data

Aug. 6, 1990 [IT] Italy .............................. 67617 A/90

[51] Int. Cl.[5] .............................................. B23P 19/00

[52] U.S. Cl. ........................................ 29/732; 29/739; 29/845; 29/884; 227/107

[58] Field of Search .......... 29/596, 732, 759, 842–845, 29/884, 739; 227/107

[56] References Cited

U.S. PATENT DOCUMENTS

| | | | |
|---|---|---|---|
| 2,814,802 | 12/1957 | Maximoff | 29/739 |
| 2,970,370 | 2/1961 | Weaver et al. | 29/739 |
| 3,067,902 | 12/1962 | Maximoff et al. | 227/54 |
| 3,566,464 | 3/1971 | Bakermans | 29/842 |
| 3,574,935 | 4/1971 | Berg | 29/739 |
| 3,812,569 | 5/1974 | Kufner et al. | 29/203 B |
| 3,984,908 | 10/1976 | Ackley | 29/596 |
| 4,043,033 | 8/1977 | Yeo | 29/739 |
| 4,386,464 | 6/1983 | Yanai et al. | 29/739 |
| 4,433,476 | 2/1984 | Bailey et al. | 29/752 |

OTHER PUBLICATIONS

Payne, P., "Automatic Pin Inserter", *IBM Technical Disclosure Bulletin*, vol. 26, No. 1, Jun. 1983, pp. 424–426.

*Primary Examiner*—P. W. Echols
*Attorney, Agent, or Firm*—Jeffrey H. Ingerman

[57] ABSTRACT

Apparatus for taking a plurality of terminals arranged in a first spatial configuration, and rearranging them into a second spatial configuration for insertion into a stator or other electrical component, is provided. The apparatus includes a plurality of tubes, one for each terminal, which convey the terminals to new locations and, if necessary, twist along the way to change the orientations of the terminals.

31 Claims, 8 Drawing Sheets

101
112
102
100
63

110
101
112
111
21
71
91

10
10
63
90
91
72
230

APPARATUS FOR ARRANGING AND INSERTING TERMINALS IN AN ELECTRICAL COMPONENT

BACKGROUND OF THE INVENTION

This invention relates to machines for assembling terminals to electrical components, and especially electric motor components such as stators. More particularly, this invention relates to machines for arranging terminals for assembly onto electric motor stators.

With certain electrical components, and particularly wound electric motor components such as stators, it is necessary to apply a plurality of terminals to the component. In the case of a stator, for example, at least two terminals, for terminating at least two ends of a single winding, must be applied to the end of the stator or to a terminal board attached to the end of the stator. For stators with multiple windings, such as those for use in multi-speed motors, the number of terminals is correspondingly multiplied.

In addition, terminals are usually provided interconnected in strip form and are cut apart by the terminal applying apparatus. Thus the terminals are generally arranged linearly in the apparatus, reflecting their linear configuration before they are cut apart. However, the arrangement of the terminals on the electrical component is not necessarily linear. For example, a stator has a substantially annular end face. While it may be possible to arrange the terminals linearly on one side of the end face, or possibly on two parallel sides, as the number of terminals increases, it becomes more likely that a nonlinear arrangement of terminals will be required.

It has not heretofore been easy to apply terminals in nonlinear arrangements. Most known terminal applying machines fed one or two strips of terminals, allowing for one or two parallel rows of terminals in the final arrangement. In another known machine for applying terminals around the annular end face of a stator, the stator was held in a rotating arbor that was indexed to a new position after each terminal was applied. This added significantly to the time required to apply terminals to a stator, especially as compared to previously known machines for applying linear arrangements of terminals, in which all of the terminals could be driven into position at once.

In other known systems, the various terminals were positioned and oriented by a complicated lever system. However, the number of terminals that could be accommodated in such apparatus was limited, because the lever system became too complex if too many terminals were involved. In addition, such lever systems are generally too complex to allow adjustment of a single system for different arrangements of terminals.

It would be desirable to be able to provide apparatus for applying a plurality of terminals to an electrical component, such as a stator, particularly in nonlinear arrangements.

It would also be desirable to be able to provide such apparatus which could accommodate a plurality of arrangements of terminals.

SUMMARY OF THE INVENTION

It is an object of this invention to provide apparatus for applying a plurality of terminals to an electrical component, such as a stator, particularly in nonlinear arrangements.

It is also an object of this invention to provide such apparatus which can accommodate a plurality of arrangements of terminals.

In accordance with this invention, there is provided apparatus for inserting a plurality of terminals in an electrical component, where the plurality of terminals enters the apparatus in a first spatial configuration and is inserted in the electrical component in any second spatial configuration. The apparatus includes feeding means for feeding the plurality of terminals in the first spatial configuration, rearranging means for receiving the plurality of terminals in the first spatial configuration and rearranging them into the second spatial configuration, and receiving means in contact with the rearranging means and the electrical component for receiving the rearranged plurality of terminals in the second spatial configuration and passing the rearranged plurality of terminals to the electrical component. Driving means drives the plurality of terminals from the feeding means through the rearranging means and the receiving means, whence inserting means inserts the rearranged plurality of terminals into the electrical component. The rearranging means and the receiving means are removable and interchangeable, whereby any desired rearranging means, and any corresponding receiving means, for producing any desired second spatial configuration, can be inserted into the apparatus, such that the apparatus can produce any second spatial configuration.

Configuration adjustment apparatus including the rearranging means and the receiving means, for use with a terminal insertion machine, is also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
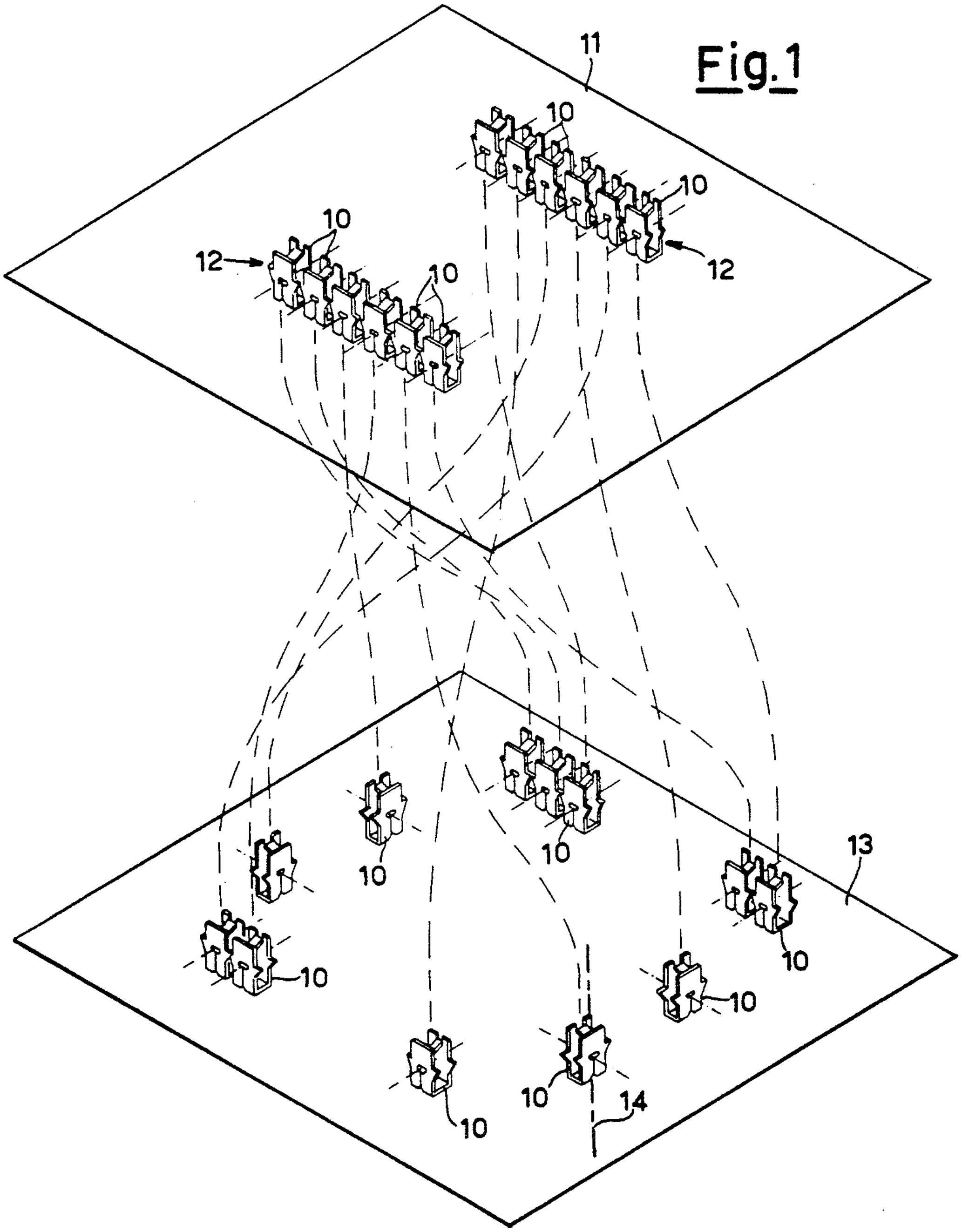
FIG. 1 is a schematic perspective view of first and second spatial configurations of terminals according to this invention.

The problem to be solved by the present invention is illustrated schematically in FIG. 1. As shown, terminals 10 are provided initially in a first spatial configuration in plane 11, all oriented identically and arranged in two parallel rows 12, although if fewer terminals are required, they can be arranged in a single row 12. An exemplary desired second spatial configuration of terminals 10 is shown in plane 13, although it is to be understood that the desired second spatial configuration could be any configuration.

Corresponding terminals 10 in planes 11, 13 are shown interconnected by broken lines. As can be seen, not only does the position of each terminal change as between plane 11 and plane 13, but the angular orientation of each terminal 10 about its vertical axis 14 may change as well.

Figure 2:
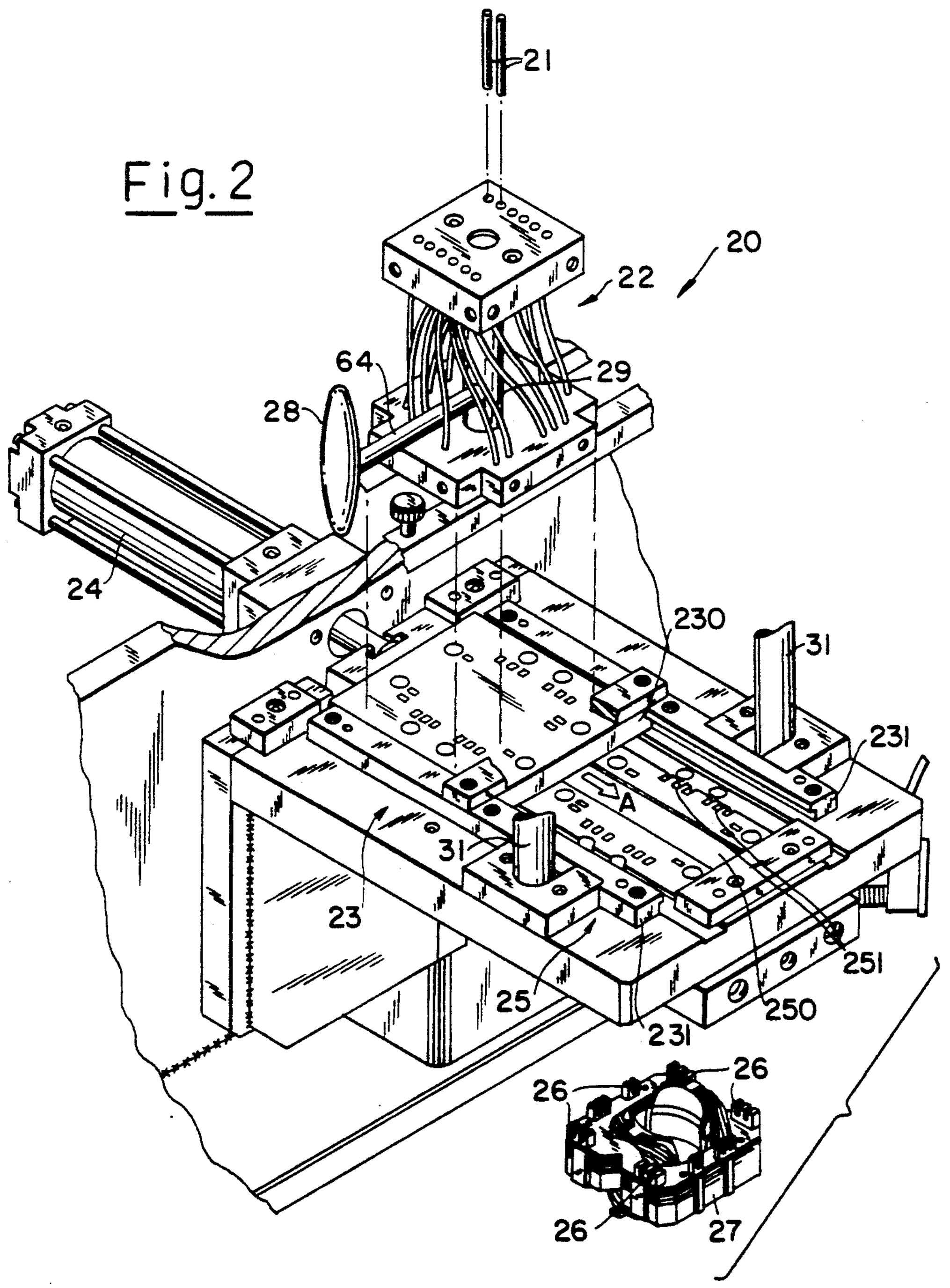
FIG. 2 is an exploded partially fragmentary perspective view of apparatus, incorporating the present invention.
Figure 3:
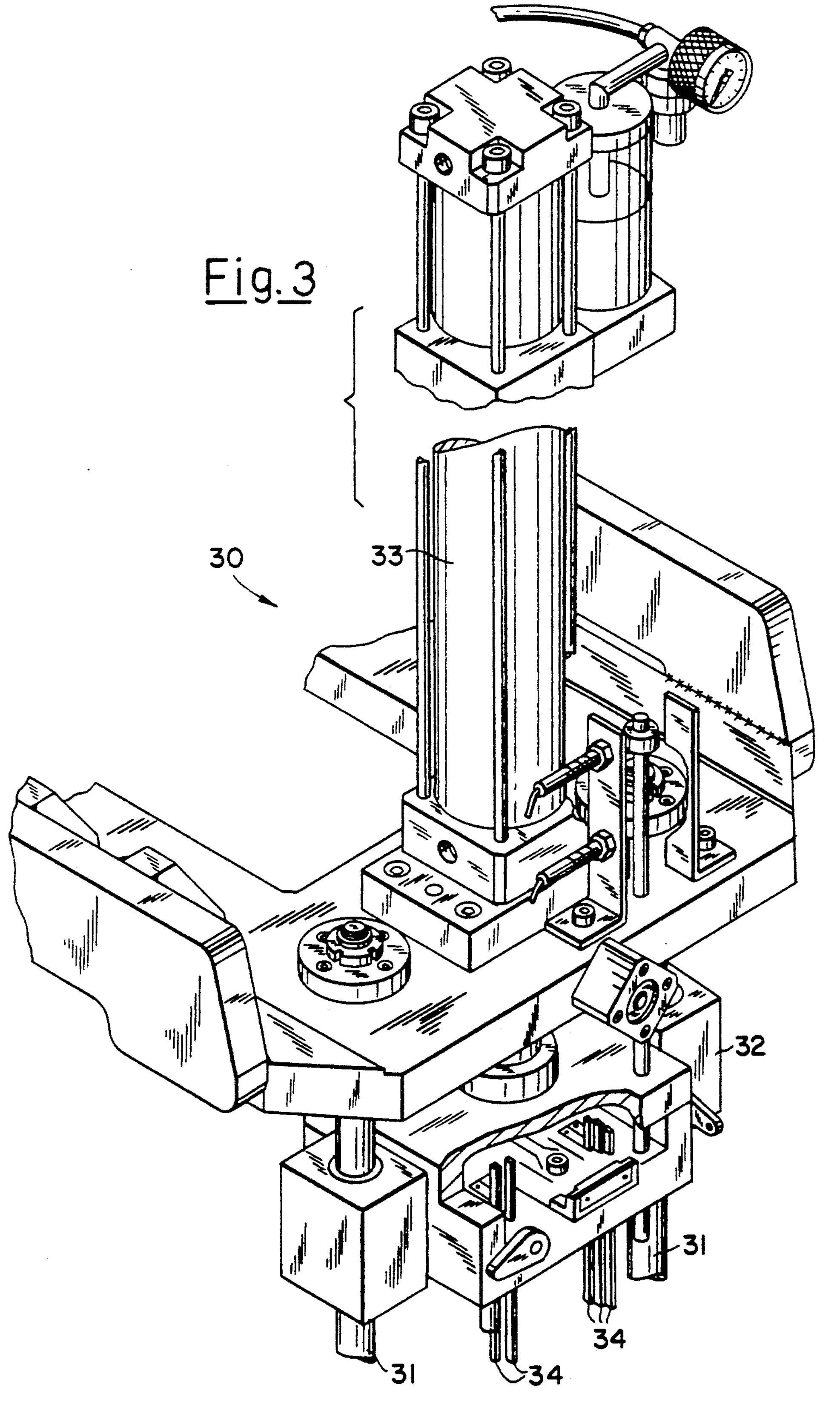
FIG. 3 is a perspective view of a ramming unit used with the invention.

Apparatus 20 incorporating a preferred embodiment of the present invention for rearranging terminals 10 is shown in FIG. 2. In accordance with the invention, terminals 10 are driven by pushers 21 through a rearranging stage 22, from which they emerge at station 23 in the desired second spatial configuration. The terminals are received in receiving plate 230 and plate 230 is translated between guides 231 in the direction of arrow A by means of cylinder 24, with the terminals in the same configuration, to station 25. There the terminals are rammed through mating passages 251 in plate 250 into terminal receptacles 26 on stator 27 (or other electrical component) by overhead ramming unit 30 of FIG. 3. Stator 27 is held in a suitable fixture (not shown). The wire ends of the various windings to be terminated may have already been inserted into receptacles 26 in the appropriate manner to assure a proper connection, or they may be inserted into terminals 10 later. In particular, if the component into which terminals 10 are being inserted is not a stator, but is instead a stator terminal board which will later be attached to a stator, there will be no wire ends to insert at this point.

Overhead ramming unit 30 is supported on apparatus 20 by columns 31. Trolley 32 is driven vertically on columns 31 by cylinder 33, and carries rigid cams 34 which push terminals 10 into receptacles 26. Cylinder 33 preferably operates in a two-stage downward motion. In the first stage it moves downward rapidly with little force, driving terminals 10 quickly towards receptacles 26. In the second stage it moves downward slowly and a very small distance with extremely high force, for securely ramming terminals 10 into receptacles 26. The action of trolley 32 may also actuate cutters (not shown) on the underside of plate 250 for trimming the excess ends of the windings once terminals 10 have been properly seated. Such cutters would be actuated at the very end of the second stage of the action of cylinder 33.

Figure 5:
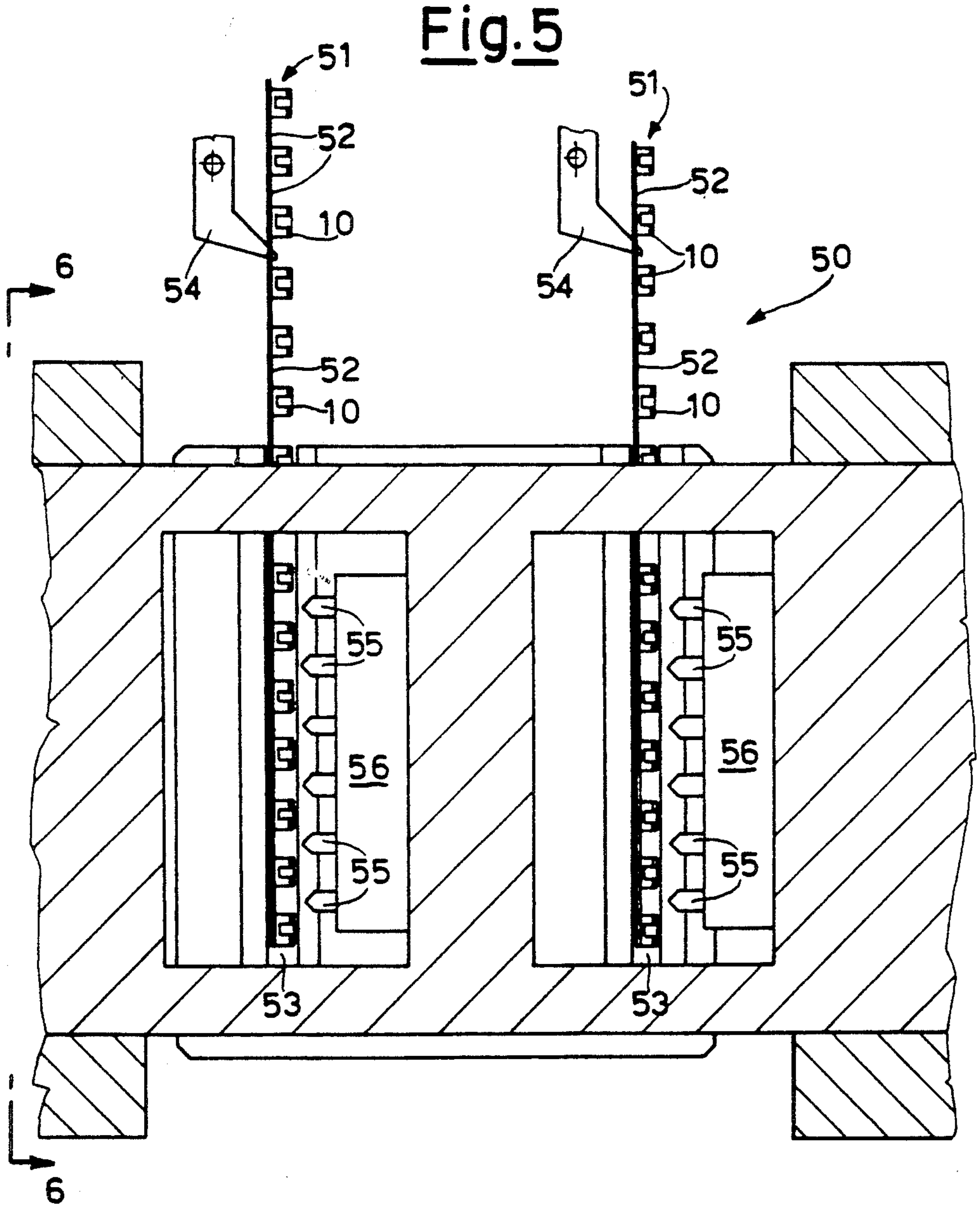
FIG. 5 is a fragmentary plan view of the apparatus incorporating the present invention, taken from line 5-5 of FIG. 4, showing the terminal feeding and cutting means.
Figure 6:
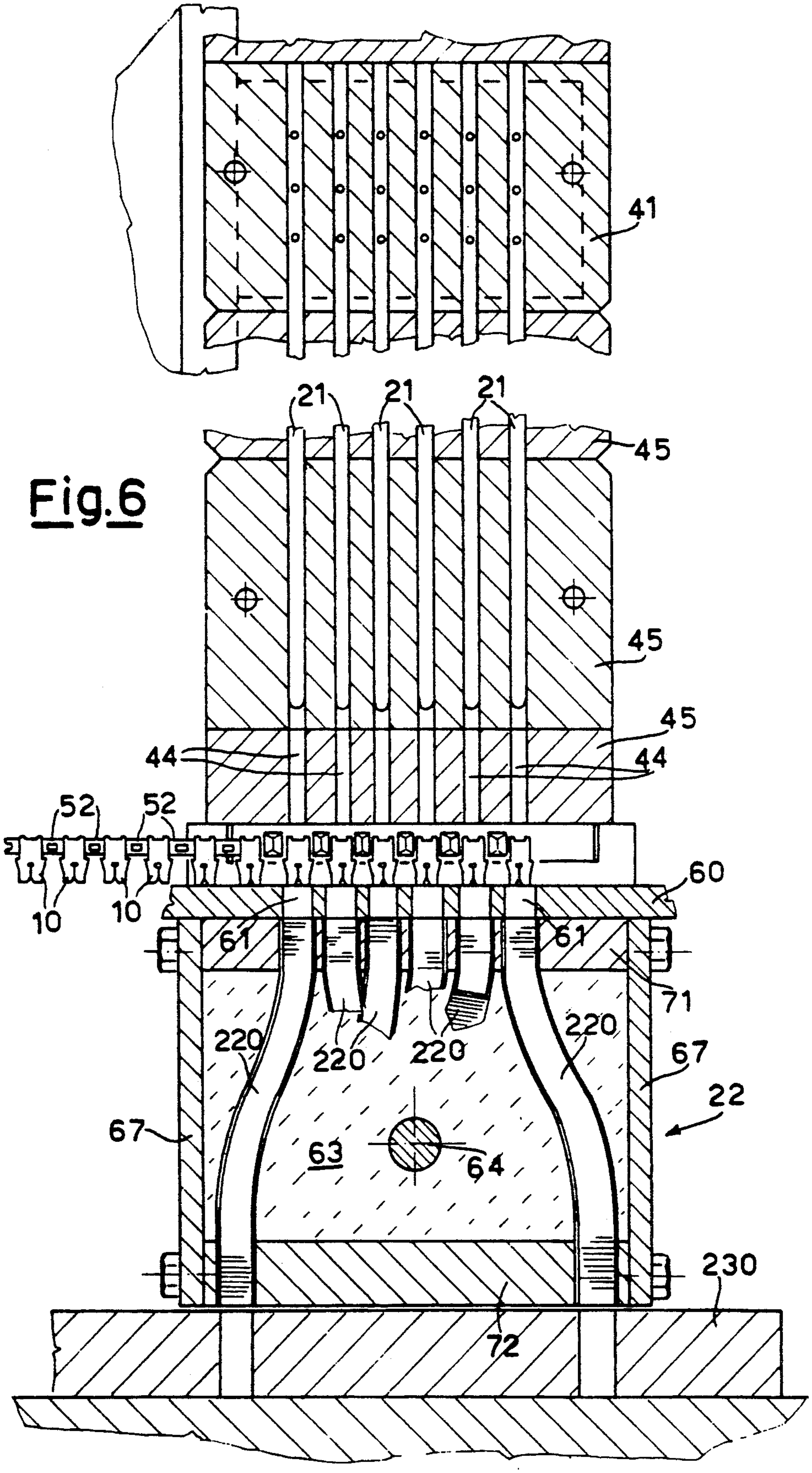
FIG. 6 is a fragmentary vertical cross-sectional view of the apparatus incorporating the present invention taken from line 6-6 of FIG. 5.

Feed stage 50 of apparatus 20 is shown in FIGS. 5 and 6. Strips 51 of terminals 10, interconnected by intermediate portions 52, are fed into guides 53 by advancing units 54. Guides 53 rest above plate 60, which has mating passages 61 for receiving terminals 10. Cutters 55, rigidly mounted to carriers 56, sever intermediate portions 52 so that pushers 21 can push terminals 10 into passages 61. Intermediate portions 52 are then discarded. Of course, it may be possible to feed a series of unconnected terminals 10 into guides 53, properly spaced to register with passages 60, in which case cutters 55 would not be necessary, and there would be no need to dispose of intermediate portions 52.

Figure 7:
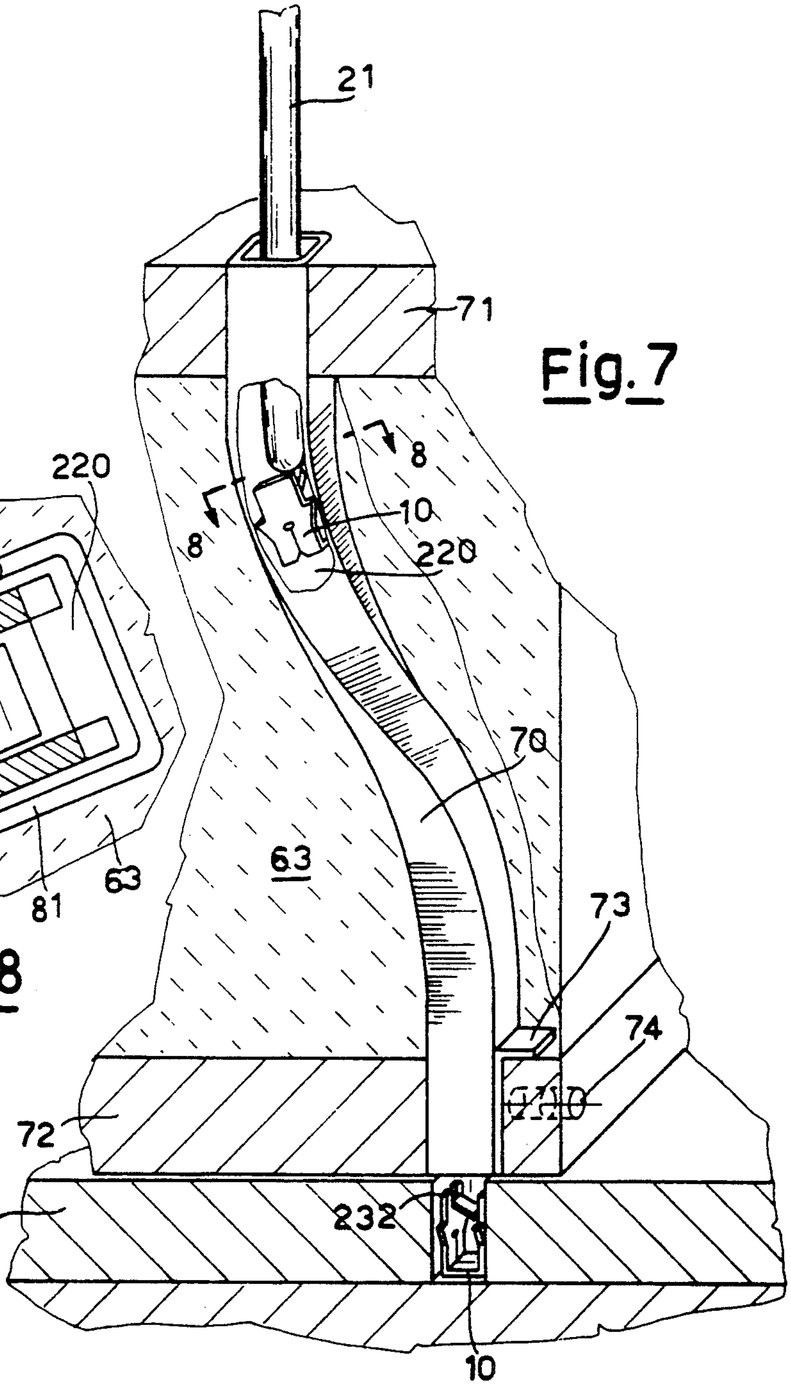
FIG. 7 is an enlarged fragmentary perspective view of apparatus according to the present invention, showing a terminal passage.
Figure 8:
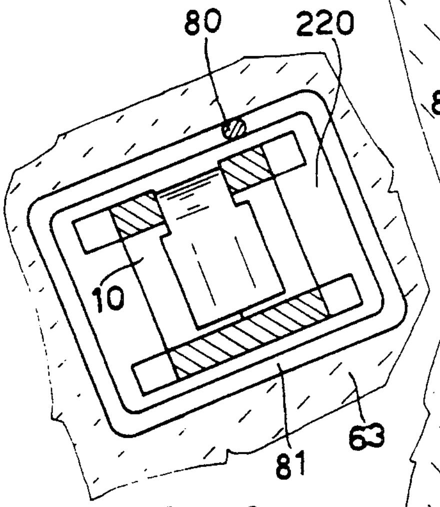
FIG. 8 is a cross-sectional view of the passage of FIG. 7, taken from line 8—8 of FIG. 7.

After pushers 21 push terminals 10 into passages 61, they continue to push terminals 10 into mating passages 220 of rearranging stage 22. An embodiment of rearranging stage 22, for cases where terminals 10 have a generally regular cross section in the direction perpendicular to the direction of travel through passages 220, is shown in more detail in FIGS. 7 and 8. A passage 220 is provided for each terminal 10 present in the desired configuration. Passages 220 are formed by tubes 70, having a cross section generally the same as that of terminal 10. Each tube 70 is anchored to top plate 71 of rearranging stage 22 and to bottom plate 72 of rearranging stage 22. At plate 71, each passage 220 registers with a corresponding passage 61 of plate 60. By providing an appropriate length of tube 70, each passage 220 can be brought to a desired point on plate 72, in registry with a passage 232 in receiving, or transfer, plate 230. Passages 232 have the same cross sections as tubes 70, and locations and orientations in accordance with the desired second configuration. Not only can the location of terminal 10 in the horizontal plane be changed, but by twisting tube 70, as shown in FIG. 7, its orientation about its axis 14 can be changed. The rate of twist cannot be too great, however, in order to prevent jamming of terminal 10 in tube 70 as it passes through. A flange 73 and screw or other fastener 74 are provided to secure tube 70 to plate 72 against the restoring forces that would tend to dislodge it.

Tubes 70 must be sufficiently flexible and strong to be twisted and bent to bring terminals 10 to their desired locations. They must also have smooth interior surface to avoid catching the edges of terminals 10. In a preferred embodiment for use with terminals of regular, convex cross section, tubes 70 are wound from wire 80 around an appropriately shaped mandrel. To maintain a smooth interior surface, each turn 81 of wire 80 must touch its neighboring turns. Therefore, wire 80 is preferably plastically deformed as it is wound, to overcome any elastic restoring forces that might tend to separate the turns 81. Proper choice of the wire material and dimensions, and the degree of plastic deformation, will impart the necessary flexibility to tubes 70.

It is also preferable to encase tubes 70 in heat shrinkable sleeves, which are heated after tubes 70 have been placed in their desired positions, fixing them rigidly. This rigidity prevents tubes 70 from moving during terminal insertion. Greater rigidity can be achieved by enclosing entire rearranging stage 22 in walls 62 and filling the interior between tubes 70 with a resinous or other hardening material 63.

Rearranging stage 22 is intended to be removable from apparatus 20 so that other rearranging stages 22, producing other configurations of terminals 10, can be inserted in its place. To facilitate the removal of rearranging stage 10, a handle 28 projects from rearranging stage 22 on arm 64, which is itself fixed to post 29 which also interconnects plates 71, 72 and keeps them at their predetermined separation distance. Handle 28 is particularly useful if rearranging stage 22 is provided with walls 62.

Thus, in order to change the second, or output, configuration of terminals 10, one simply removes rearranging stage 22 (using handle 28 where provided), as well as receiving or transfer plate 230, and replaces them with an appropriate other rearranging stage 22 and plate 230.

Pushers 21 according to the invention must be sufficiently strong to advance terminals 10 through tubes 70 without buckling. However, they must also be able to deform as tube 70 twists and turns. Similarly, they must have a low coefficient of friction to avoid both excessive wear and binding at turns in tubes 70. One preferred material that meets these requirements is polytetrafluoroethylene (PTFE), better known by the TEFLON ® trademark under which it is sold.

Figure 4:
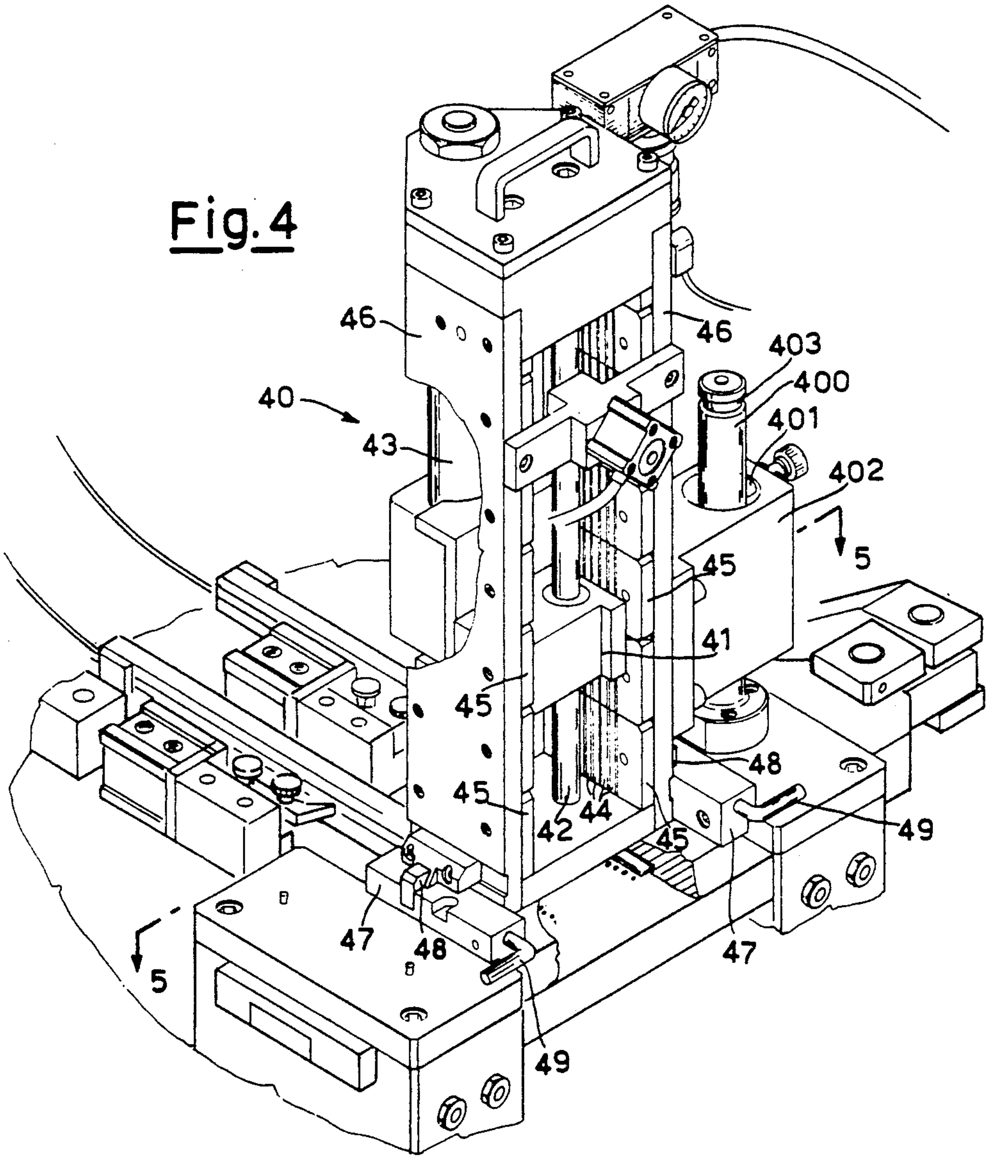
FIG. 4 is a fragmentary perspective view of a portion of the apparatus used with this invention, showing the driving means.

Apparatus 40 for moving pushers 21 is shown in detail in FIG. 4. Pushers 21 are driven by slide 41, which moves along two posts 42 (only one shown) under the action of cylinder 43. Pushers 21 are guided in channels 44 milled into plates 45 supported by side walls 46. Plates 45 are preferably brass.

Apparatus 40 is supported above feed stage 50 on side blocks 47, to which it is locked by teeth 48. If access to feed stage 50 is required, handles 49 can be used to release teeth 48, allowing apparatus 40 to be raised on column 400 until tooth 401 of support sleeve 402 engages slot 403 on column 400, at which time apparatus 40 can be pivoted out of the way about column 400.

Figures 9, 10, 11:
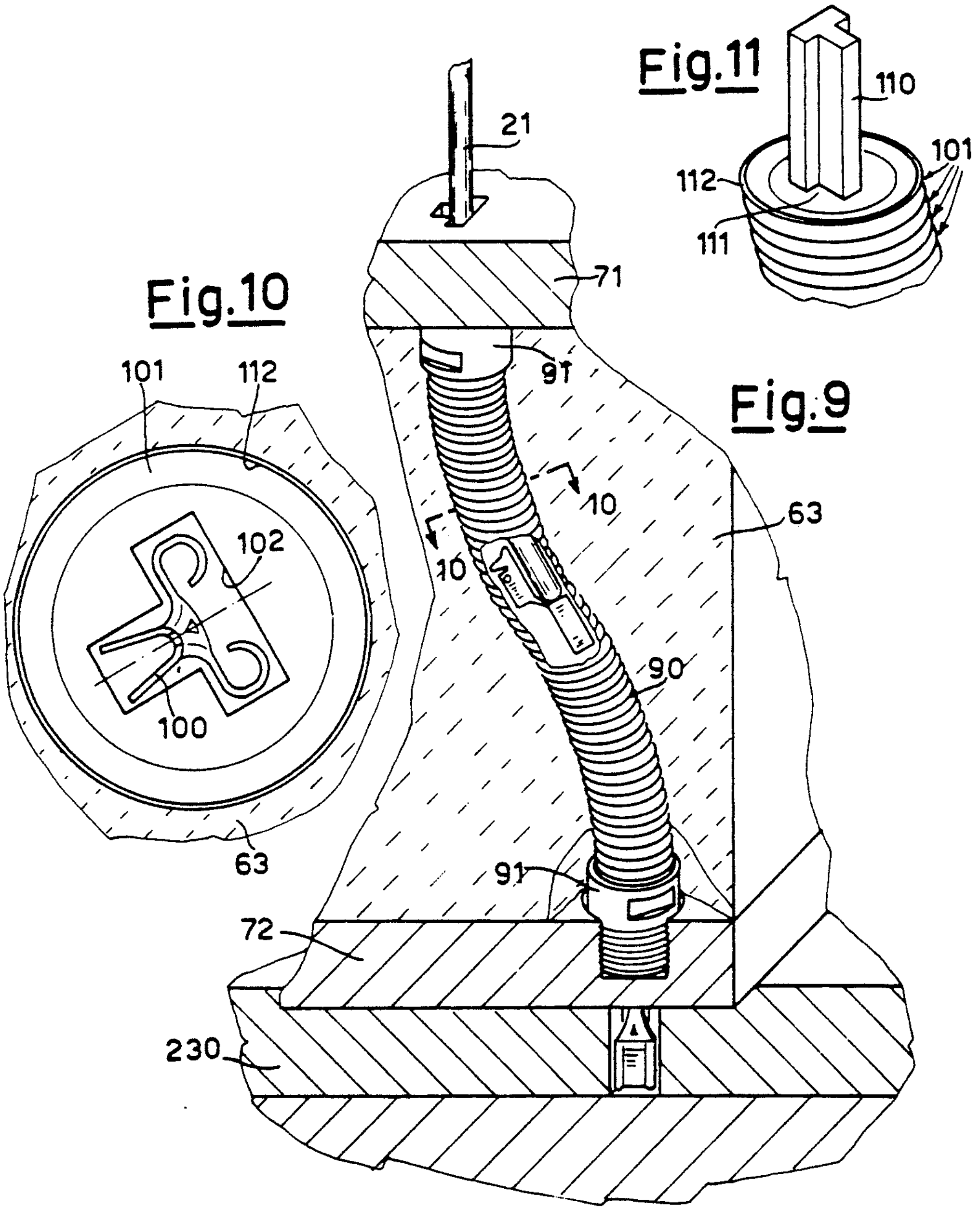
FIG. 9 is a view similar to FIG. 7 of an alternate embodiment of the invention.
FIG. 10 is a cross-sectional view, similar to FIG. 8, of the passage of FIG. 9, taken from line 10—10 of FIG. 9.
FIG. 11 is a fragmentary perspective view showing the construction of the passage of FIGS. 9 and 10.

An alternative embodiment for the construction of rearrangement passages 220 is shown in FIGS. 9-11. This alternative construction is particularly useful with terminals 100 having concave or irregular cross sections, but can be used for terminals of any cross section. Tubes 90 are formed by using disks 101 into which are punched holes 102 of appropriate cross section. Disks 101 are also punched in such a way as to be slightly concave.

A flexible mandrel 110 of the same cross section as holes 102 is bent to match the desired trajectory of tube 90. Disks 101 are then arranged on mandrel 110 with their concavities in alternating directions, so that each disk 100 touches one neighboring disk 101 in the center 111, and another neighboring disk 101 at rim 112, so that they are spaced apart from one another.

Completed tubes 90 can then be inserted into rearranging stage 22 in the same manner as tubes 70, except that preferably a different type of fitting 9 is used to attach tubes 90 to plates 71, 72. The spaces between disks 101 are then filled with a resinous or other hardening material similar to resin 63, in a manner similar to that described above in connection with tubes 70. Specifically, the entire rearranging stage could be encased in walls 62 and the interior could be filled with material 63, which would fill the spaces between disks 101 as well. After the resin has hardened mandrel 110 is withdrawn. Mandrel 110 is preferably made from a material that does not stick to whatever material is used to fill the spaces between disks 101.

Thus it is seen that apparatus for applying a plurality of terminals to an electrical component, such as a stator, particularly in nonlinear arrangements, which apparatus can accommodate a plurality of arrangements of terminals, is provided. One skilled in the art will appreciate that the present invention can be practiced by other than the described embodiments, which are presented for purposes of illustration and not of limitation, and the present invention is limited only by the claims which follow.

What is claimed is:

1. Apparatus for inserting a plurality of terminals in an electrical component, said plurality of terminals entering said apparatus in a first spatial configuration and being inserted in said electrical component in any one of a plurality of second spatial configurations, said apparatus comprising:

feeding means for feeding said plurality of terminals in said first spatial configuration;

a plurality of rearranging means for receiving said plurality of terminals in said first spatial configuration, each one of said plurality of rearranging means rearranging said plurality of terminals into one of said plurality of second spatial configurations;

a plurality of receiving means, corresponding in number to said plurality of rearranging means, for placing in contact with said rearranging means and said electrical component, each of said plurality of receiving means receiving said rearranged plurality of terminals in one of said plurality of second spatial configurations and passing said rearranged plurality of terminals to said electrical component;

driving means including a plurality of flexible pushers corresponding in number to said plurality of terminals for driving said plurality of terminals from said feeding means through said rearranging means and into said receiving means; and inserting means for inserting said rearranged plurality of terminals in said receiving means into said electrical component; wherein:

said rearranging means and said receiving means are removable and interchangeable; and any desired rearranging means, and its corresponding receiving means, for producing any desired one of said plurality of second spatial configurations, can be inserted into said apparatus; whereby:

said apparatus can produce any one of said plurality of second spatial configurations.

2. The apparatus of claim 1 wherein each of said plurality of rearranging means is for a different desired one of said plurality of second spatial configurations.

3. The apparatus of claim 1 wherein at least one of said first and second spatial configurations is planar.

4. The apparatus of claim 1 wherein each of said plurality of rearranging means comprises a plurality of tubular passages corresponding in number to said plurality of terminals, said passages having entrance ends arranged in said first spatial configuration and exit ends arranged in one of said plurality of second spatial configurations.

5. The apparatus of claim 4 wherein each of said tubular passages has a cross section corresponding to the terminal cross section.

6. The apparatus of claim 5 wherein:

each of said plurality of second spatial configurations is defined by relative locations of said terminals and by angular orientations of said terminal cross sections in said locations;

said passages are configured with said exit ends in said locations; and each of said exit ends is angularly oriented in accordance with the desired angular orientation of its respective terminal.

7. The apparatus of claim 5 wherein each of said pushers has a cross section corresponding to said terminal cross section.

8. The apparatus of claim 4 wherein:

each of said plurality of receiving means comprises a plate having a number of receiving channels corresponding to said plurality of terminals; and when one of said plurality of rearranging means and a corresponding one of said plurality of receiving means are inserted into said apparatus, said receiving channels are aligned with said exit ends of said passages.

9. The apparatus of claim 4 wherein:

said feeding means comprises:

a plate having a number of feed channels corresponding to said plurality of terminals, and means for placing each of said terminals in a respective one of said feed channels; and when one of said plurality of rearranging means is inserted into said apparatus, said feed channels are aligned with said entrance ends of said passages.

10. The apparatus of claim 1 wherein said inserting means comprises:

means for translating said one of said plurality of receiving means to a position adjacent said electrical component; and ramming means for ramming said terminals from said one of said plurality of receiving means into said electrical component.

11. The apparatus of claim 10 wherein:

each of said plurality of receiving means comprises a plate having a number of receiving channels corresponding to said plurality of terminals; and said receiving channels are positioned in accordance with one of said plurality of second spatial configurations.

12. The apparatus of claim 1 wherein said feeding means comprises:

a plate having a number of feed channels corresponding to said plurality of terminals; and means for placing each of said terminals in a respective one of said feed channels.

13. The apparatus of claim 12 wherein each of said feed channels has a cross section corresponding to the terminal cross section.

14. The apparatus of claim 12 wherein said feeding means further comprises:

means for accepting at least one strip of interconnected terminals; and means for cutting individual terminals from said at least one strip.

15. Terminal transfer apparatus for transferring a plurality of electrical terminals from a first location, in which they are arranged in a first spatial configuration, to a second location, in which they are arranged in a second spatial configuration, said apparatus comprising:

first fixed passage means having a plurality of passages therethrough, said passages arranged in said first spatial configuration, for receiving said terminals;

second passage means having a plurality of tubes having entrance ends adjacent the passages of said first passage means and exit ends arranged in said second spatial configuration; and a plurality of flexible pushers corresponding in number to said plurality of electrical terminals, for pushing said terminals from said passages in said first fixed passage means through said tubes, whereby said terminals exit said tubes in said second spatial configuration.

16. The terminal transfer means of claim 15 wherein said tubes are rigidly fixed for transferring said terminals from said first spatial configuration to said second spatial configuration.

17. The terminal transfer means of claim 18 wherein said tubes are flexible and are removably attached to said third fixed passage means, whereby said tubes can be arranged to transfer said terminals to any of a plurality of second spatial configurations.

18. The apparatus of claim 15 further comprising third fixed passage means having a plurality of passages therethrough, said passages arranged adjacent said exit ends of said tubes in said second spatial configuration, for receiving said terminals.

19. The apparatus of claim 18 comprising:

a plurality of said second passage means, each one of said plurality of second passage means having said exit ends arranged in one of a plurality of second spatial configurations;

a plurality of said third fixed passage means corresponding in number to said plurality of second passage means, each one of said plurality of third fixed passage means having the passages therethrough arranged in one of said plurality of second spatial configurations; wherein:

said second passage means and said third fixed passage means are removable and interchangeable; and any desired second passage means, and its corresponding third fixed passage means, for producing any desired one of said plurality of second spatial configurations, may be inserted into said apparatus; whereby:

said apparatus can produce any one of said plurality of second spatial configurations.

20. The apparatus of claim 18 further comprising inserting means for inserting said rearranged plurality of terminals in said third fixed passage means into an electrical component.

21. The apparatus of claim 20 wherein said inserting means comprises:

means for translating said third fixed passage means to a position adjacent said electrical component; and ramming means for ramming said terminals from said third fixed passage means into said electrical component.

22. The apparatus of claim 21 wherein:

said third fixed passage means comprises a plate having number of receiving channels corresponding to said plurality of terminals; and said receiving means is inserted into said apparatus, said receiving channels are aligned with said exit ends of said passages in accordance with said second spatial configuration.

23. The apparatus of claim 15 comprising a plurality of said second passage means, each one of said plurality of second passage means having said exit ends arranged in one of a plurality of second spatial configurations; wherein:

said second passage means are removable and interchangeable; and any desired second passage means, for producing any desired one of said plurality of second spatial configurations, can be inserted into said apparatus; whereby:

said apparatus can produce any one of said plurality of second spatial configurations.

24. The apparatus of claim 23 wherein each of said plurality of second spatial configurations is defined by relative locations of said terminals and by angular orientations of the terminal cross sections in said locations;

said passages are configured with said exit ends in said locations; and each of said exit ends is angularly oriented in accordance with the desired angular orientations of its respective terminal.

25. The apparatus of claim 15 further comprising feeding means for feeding said plurality of terminals in said first spatial configuration to said first fixed passage means.

26. The apparatus of claim 25 wherein said feeding means comprises:

a plate having a number of feed channels corresponding to said plurality of terminals; and means for placing each of said terminals in a respective one of said feed channels.

27. The apparatus of claim 26 wherein each of said feed channels has a cross section corresponding to the terminal cross section.

28. The apparatus of claim 26 wherein said feeding means further comprises:

means for accepting at least one strip of interconnected terminals; and means for cutting individual terminals from said at least one strip.

29. The apparatus of claim 15 wherein at least one of said first and second spatial configuration is planar.

30. The apparatus of claim 15 wherein each of said passages and tubes has a cross section corresponding to the terminal cross section.

31. The apparatus of claim 30 wherein each of said pushers has a cross section corresponding to said terminal cross section.

* * * * *